US000001167H

United States Statutory Invention Registration [19]

[11] Reg. Number: H1167

Uezawa et al.

[43] Published: Apr. 6, 1993

[54] PROCESS FOR MANUFACTURING SILVER HALIDE COLOR PHOTOGRAPHIC LIGHT SENSITIVE MATERIAL

[75] Inventors: Kuniaki Uezawa; Masaru Iwagaki; Kiichi Sato; Hideo Akamatsu; Minoru Ishikawa, all of Hino, Japan

[73] Assignee: Konica Corp., Japan

[21] Appl. No.: 586,682

[22] Filed: Sep. 24, 1990

[30] Foreign Application Priority Data

Sep. 27, 1989 [JP] Japan ..... 1-253078

[51] Int. Cl.[5] ..... G03C 1/46

[52] U.S. Cl. ..... 430/506; 430/509

[58] Field of Search ..... 430/502, 506, 509, 567

[56] References Cited

U.S. PATENT DOCUMENTS

| | | | |
|---|---|---|---|
| 4,481,288 | 11/1984 | Yamada et al. | 430/509 |
| 4,511,648 | 4/1985 | Yamashita et al. | 430/509 |
| 4,547,458 | 10/1985 | Iijima et al. | 430/505 |
| 4,639,410 | 1/1987 | Mochizuki et al. | 430/506 |
| 4,727,016 | 2/1988 | Bando | 430/567 |
| 4,865,964 | 9/1989 | Newmiller | 430/509 |

FOREIGN PATENT DOCUMENTS

| | | | |
|---|---|---|---|
| 106705 | 4/1984 | European Pat. Off. | 430/509 |
| 107817 | 5/1984 | European Pat. Off. | 430/509 |
| 3502490 | 8/1985 | Fed. Rep. of Germany | 430/509 |

*Primary Examiner*—Robert L. Stoll
*Assistant Examiner*—Joseph D. Anthony
*Attorney, Agent, or Firm*—Bierman and Muserlian

[57] ABSTRACT

A process for manufacturing a silver halide color photographic material is disclosed. The photographic material comprises a blue light-sensitive layer-unit, a green light-sensitive layer-unit and a red light-sensitive layer-unit in which at least one of the light-sensitive layer-units comprises two or three silver halide emulsion layers being substantially the same in spectral sensitivity and different in speed from each other. The manufacturing process comprises steps of producing a high-speed silver halide emulsion having a largest average grain size among the silver halide emulsions to be used in the at least one light sensitive layer-unit, chemically sensitizing the high-speed silver halide emulsion, producing a low-speed silver halide emulsion having a smaller average grain size than that of the high-speed emulsion, chemically sensitizing the low-speed emulsion, mixing the chemically sensitized high-speed and the chemically sensitized low-speed emulsion in a ratio of from 5:95 to 50:50 by weight in terms of silver, and coating the chemically sensitized high-speed emulsion and the mixture of the chemically sensitized high-speed emulsion and the chemically sensitized low-speed emulsion to form the at least one light-sensitive layer-unit.

The photographic material is improved in adaptability to fluctuation of processing conditions.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MANUFACTURING SILVER HALIDE COLOR PHOTOGRAPHIC LIGHT SENSITIVE MATERIAL

FIELD OF THE INVENTION

The present invention relates to a process for manufacturing silver halide color photographic light-sensitive material, more particularly to a process for manufacturing reversal-type color photographic light-sensitive material improved in processability.

BACKGROUND OF THE INVENTION

A silver halide color photographic light-sensitive material is required to be improved in various aspects. In particular, in response to the recent demand for a higher image quality, a light-sensitive material is required to have a more improved gradation as well as stability against the variation of processing conditions.

Generally, the gradation of an image is controlled by changing the properties of a silver halide grain. For instance, a desired gradation is obtained by mixing two or more silver halides differing in grain diameter and sensitivity. Gradation is also adjusted by dividing a color-sensitive layer into two or more layers, i.e., a high-sensitive layer comprising silver halide grains with larger grain sizes and a low-sensitive layer comprising silver halide grains with smaller grain sizes.

A reversal-type color photographic light-sensitive material is demanded to be stable against the variation of processing conditions.

As described in T. H. James ed. "The Theory of the Photographic Process", 4th ed.(New York, Macmillan), p 336, the development of a reversal-type color photographic light-sensitive material comprises the following steps; the 1st development in which monochromatic development is carried out; fogging of the residual silver halide by light exposure or chemicals; color development in the presence of a coupler; bleaching; and fixing. In the above process, a silver halide left undeveloped in the 1st development is fogged, and the fogged silver halide is then subjected to color development. Such complicated processing procedures result in a greater variation of processing conditions, and then leads to a greater variation of photographic properties. In the case of a reversal-type color photographic light-sensitive material, if the same color-sensitive layer is divided into a high-sensitive layer and a low-sensitive layer, a difference in grain size causes a difference in developability in these layers in the 1st development, resulting in a greater variation of processing conditions. Such variation makes the gradation of an image ill-balanced by forced development in the case of a reversal film, and makes photographic properties vary with processing laboratories in the case of a reversal paper.

SUMMARY OF THE INVENTION

The object of the present invention is to provide a silver halide color photographic light-sensitive material improved in stability against the variation of processing conditions.

The above object of the invention can be accomplished by a process for manufacturing a silver halide color photographic material. The photographic material comprises a blue light-sensitive layer-unit, a green light-sensitive layer-unit and a red light-sensitive layer-unit in which at least one of the light-sensitive layer-units comprises two or three silver halide emulsion layers being substantially the same in spectral sensitivity and different in speed from each other and the manufacturing process comprises steps of producing a high-speed silver halide emulsion having a largest average grain size among the silver halide emulsions to be used in the at least one light sensitive-unit, chemically sensitizing the high-speed silver halide emulsion, producing a low-speed silver halide emulsion having a smaller average grain size than that of the high-speed emulsion, chemically sensitizing the low-speed emulsion, mixing the chemically sensitized high-speed and the chemically sensitized low-speed emulsion in a ratio of from 5:95 to 50:50 by weight in terms of silver, and coating the chemically sensitized high-speed emulsion and the mixture of the chemically sensitized high-speed emulsion and the chemically sensitized low-speed emulsion to form the at least one light-sensitive layer-unit.

In the case of the at least one light sensitive layer-unit has three emulsion layers, the manufacturing process of the invention preferably further comprises steps of producing middle-speed silver halide emulsion having a average grain size smaller than that of the high-speed emulsion and chemically sensitizing the middle-speed emulsion. The high-speed emulsion may be mixed with the middle-speed emulsion and/or low-speed emulsion.

DETAILED DESCRIPTION OF THE INVENTION

The reversal-type silver halide color photographic light-sensitive material produced by the method of the present invention has blue-, green- and red-sensitive silver halide emulsion layer-units. At least one of the color-sensitive emulsion layer-units comprises two or three emulsion layers differing in sensitivity. When a color-sensitive emulsion layer-unit comprises two emulsion layers, it is preferred that a high-speed silver halide emulsion layer and a low-speed silver halide emulsion layer be provided in this sequence from the side remote from a support. Also in the case of a color-sensitive emulsion layer-unit comprises three emulsion layers, it is preferred that a high-speed layer, a middle-speed layer and a low-speed layer be provided in this order from the side remote from a support. The density forming ratio of the low-speed silver halide emulsion layer to the high-speed silver halide emulsion layer is preferably 10:90 to 90:10, more preferably 25:75 to 75:25.

When the color-sensitive emulsion layer-unit comprises three emulsion layers, the density forming ratio of the high speed emulsion layer to the other emulsion layers is preferably 5:95 to 95:5, more preferably 10:90 to 90:10, particularly 20:80 to 80:20. The ratio of the middle-speed layer to the other layers is preferably 10:90 to 90:10, more preferably 10:90 to 90:10, particularly 20:80 to 80:20, and the ratio of the low-speed layer to the other layers is preferably 5:95 to 95:5, more preferably 10:90 to 90:10 particularly 20:80 to 80:20.

In the process of the present invention the ratio of the high-speed emulsion of at last to be added to the low-speed emulsion is 5:95 to 50:50, more preferably 10:90 to 40:60.

Silver halide grains contained in the low- or middle-sensitive layer and having a grain size same as or larger than that of silver halide grains contained in a layer belonging to the same color-sensitive emulsion layer but having a sensitivity higher than that of said low- or middle-sensitive layer account for 5 to 50%, preferably 10 to 40%, of the amount of silver in said low- or middle-sensitive layer.

Silver bromide, silver iodobromide, silver chloride and silver chloroiodobromide are usable for preparing the silver halide emulsion according to the present invention. The silver chloride content is preferably 0 to 90 mol %, more preferably 0 to 50 mol %.

The silver halide emulsions according to the present invention may contain silver iodide. The silver iodide content is preferably not more than 20 mol %, more preferably not more than 12 mol %, most preferably 0 to 6 mol %. In the light-sensitive unit relating the invention, it is preferable that the high-speed emulsion has a silver iodide content of 0 to 5 mol % and the low-speed emulsion has a silver iodide content of 1 to 6 mol %. When the light-sensitive unit comprises three emulsion layers, the middle-speed emulsion preferably has a silver iodide content of 0 to 5 mol %.

In the present invention, it is preferred that the high-speed emulsion is a polydispersed emulsion having a distribution width of not less than 20% and the emulsions used with the high-speed emulsion for an emulsion layer other than the high-speed layer are each a monodispersed emulsion having a grain size distribution width of not more than 20%. In the present invention, it is especially preferable to employ a monodispersed emulsion having a grain size distribution width of not more than 20% for both of the high-speed lay and the low-speed layers. The width of grain size distribution of silver halide grains is defined by the following equation:

$$\frac{\text{Standard deviation of grain size distribution}}{\text{Average grain size}} \times 100 = \text{Distribution width (\%)}$$

The grain size as referred to herein means the average diameter, which is defined as a diameter (di) making the value of $ni \times di^3$ reach the maximum, wherein ni represents the frequency of a silver halide grain having a diameter of di (the value is rounded to three effective figures by raising the figure of the smallest cipher to a unit when it is 0.5 and over, and by omitting when it is 0.4 and lower). The grain diameter as referred to herein means the diameter of a grain when the grain is spherical. As to a grain in other shape than sphere, the grain diameter means the diameter of a circle having the same area as that of the projected image of the grain.

The grain size di can be obtained by measuring the diameter of the grain on an electron microphotograph (×10,000 to 50,000). Alternatively, the grain size can be obtained by measuring the area of the projected image of a grain. Measurement is done with respect to not less than 1,000 grains selected arbitrarily.

Here, the average grain size and the standard deviation are obtained from the above-defined di.

A monodispersed emulsion can be obtained by adding an aqueous silver salt solution and an aqueous halide solution to a gelatin solution containing seed crystals by the double-jet method while controlling pAg and pH. An especially preferable method is described in Japanese Patent Publication Open to Public Inspection (hereafter referred to as Japanese Patent O.P.I. Publication) No. 46640/1984.

The average grain size of silver halide emulsions used in the light-sensitive material of the invention is preferably 0.05 to 10.0 μm, more preferably 0.1 to 5.0 μm, most preferably 0.15 to 2.0 μm. In the light-sensitive layer-unit relating the invention, it is preferable that the high-speed emulsion has an average grain size of 0.45 to 2.0 μm and the low-speed emulsion has an average grain size of 0.15 to 0.70 μm. When the light-sensitive unit comprises three emulsion layers, the middle-speed emulsion preferably has an average grain size of 0.45 to 2.0 μm.

The silver halide grain may have a uniform halide composition from the inside to the outer surface, or may have a core/shell structure in which the inside and the outer surface of the grain have different halide compositions.

The silver halide grain may have a regular crystal shape such as cubic, octahedral and dodecahedral. In such grain, the proportion of (100) face to (111) face is not critical. It is also possible to employ a mixture of grains differing in crystal shape.

In silver halide emulsion used in the invention, during forming and/or growing a silver halide grain, a metal ion may be added by using at least one member selected from cadmium salts, zinc salts, lead salts, thallium salts, salts or complex salts of iridium, salts or complex salts of rhodium and salts or complex salts of iron so that these metal atoms can be contained in the inside and/or on the surface of the grain. A reduction sensitization nucleus can be formed in the inside and/or on the surface of the grain by placing the silver halide grains in a reductive atmosphere.

The silver halide emulsion is chemically sensitized by ordinary methods, including the sulfur sensitization method, the selenium sensitization method, the reduction sensitization method and the noble metal sensitization method which employs gold or other noble metals. These sensitization methods may be applied singly or in combination.

The silver halide emulsion can be spectrally sensitized to a prescribed wavelength region with dyes that have been employed as the sensitizing dye in the photographic industry. The sensitizing dyes may be used either singly or in combination. With such sensitizing dye, the silver halide emulsion may contain a dye which itself does not have a sensitizing effect or a super sensitizer consisting of a compound which substantially does not absorb visible rays and having a function of promoting the sensitizing effect of a sensitizing dye.

The silver halide emulsion of the invention may contain such additives as an antifoggant and a stabilizer. As the binder, gelatin is advantageously employed.

Emulsion layers and other hydrophilic colloid layers may be hardened, and may contain a plasticizer, a dispersion product (latex) of a water-insoluble or sparingly-soluble synthetic polymer.

A coupler is contained in the emulsion layers of the color photographic light-sensitive material. The emulsion layers included the light-sensitive layer-unit relating the invention preferably contain a two-equivalent coupler. Also usable are a competitive coupler for color compensation and a compound which can release, by a coupling reaction with an oxidized product of a developing agent, photographically significant fragments such as a development accelerator, a developer, a solvent for a silver halide, a toning agent, a hardener, a fogging agent, an antifoggant, a chemical sensitizer, a spectral sensitizer and a desensitizer.

Auxiliary layers such as a filter layer, an anti-halation layer and an anti-irradiation layer may be provided in the light-sensitive material. These layers and/or emulsion layers may contain a dye which flows out from the light-sensitive material or is bleached during processing.

The light-sensitive material may contain a matting agent, a lubricant, an image stabilizer, a formalin scavenger, an ultraviolet absorbent, an optical brightening agent, a surfactant, a development accelerator and a development retarder.

As the support, use can be made of polyethylene-laminated paper, a polyethylene terephthalate film, baryta paper, a cellulose triacetate film, or the like.

The light-sensitive material is processed preferably at 18° to 60° C.

The processing of the reversal-type color photographic light-sensitive material of the invention comprises the following steps:

monochromatic development (1st development)→stop→rinsing→reversal→rinsing color development→stop→rinsing→conditioning bath→rinsing→bleaching→rinsing→fixing→rinsing→stabilizing→drying Preliminary bath, pre-hardening bath and neutralizing bath may be included in the above process. Rinsing after stop, reversal, color development, conditioning bath or bleaching may be omitted. Reversal may be performed in a fogging bath or by re-exposure. The fogging bath may be omitted by adding a fogging agent to a color development bath. The compensating bath may also be omitted. The procedures of bleaching→rinsing→fixing may be performed in a bleach/fixing bath.

For a developer of the 1st development, use can be made of known development agents including dihydroxybenzenes such as hydroquinone, 3-pyrazolidones such as 1-phenyl-3-pyrazolidone, aminophenols such as N-methyl-p-aminophenol, 1-phenyl-3-pyrazolines, ascorbic acid, and a heterocyclic compound described in U.S. Pat. No. 4,067,872 which is obtained by condensation reaction between a 1,2,3,4-tetrahydroquinone ring and an indolene ring. These development agents may be employed either singly or in combination.

If need arises, the developer for the 1st development may also contain a preservative such as sulfites and bisulfites, a buffer such as carbonates, boric acid, borates and alkanol amines, an alkaline agent such as hydroxides and carbonates, a solving aid such as polyethylene glycol and esters thereof, a pH controller such as acetic acid and other organic acids, sensitizers such as quatenary ammonium salts, a development accelerator, a surfactant, a toning agent, a defoaming agent, a hardener and a thickner.

It is required that the developer for the 1st development contain a compound which serves as a solvent for a silver halide. However, normally, a sulfite which is added as a preservative performs this function. Other usable silver halide solvents include KSCN, NaSCN, $K_2SO_3$, $Na_2SO_3$, $K_2S_2O_5$, $Na_2S_2O_5$, $K_2S_2O_3$ and $Na_2S_2O_3$.

If the amount of such silver halide solvent is too small, the rate of development will be too low. On the other hand, the use of too much silver halide solvent causes the silver halide emulsion to be fogged. The appropriate amount of the silver halide solvent can be readily determined by experts.

For instance, when $SCN^-$ is used, the amount is preferably 0.005 to 0.02 mol, more preferably 0.01 to 0.015 mol, per liter of the developer. In the case of $SO_3^{2-}$, the amount is preferably 0.05 to 1 mol, more preferably 0.1 to 0.5 mol, per liter of the developer. The developer for the 1st development may further contain an antifoggant such as halides, e.g. potassium bromide, sodium bromide, benzimidazoles, benzotriazoles, benzothiazoles, tetrazoles and thiazoles; and a chelating agent such as ethylenediamine tetraacetic acid and alkaline metal salts thereof, polyphosphates and nitroacetates. The pH of the developer is controlled to a level sufficient for obtaining prescribed density and in the processed light-sensitive material contrast, but preferably in the range of 8.5 to 11.5.

EXAMPLES In the examples given below, the coated amount of each component is indicated by g/m², except for that of a silver halide which is given in terms of silver.

EXAMPLE 1

On a subbed cellulose acetate film, layers with the following compositions were provided in order from the side of the support, thereby to obtain a multilayer silver halide color photographic light-sensitive material (Comparative sample 1).

| | |
|---|---|
| 1st layer: Antihalation layer | |
| Ultraviolet absorbent U-1 | 0.3 |
| Ultraviolet absorbent U-2 | 0.4 |
| High-boiling solvent O-1 | 1.0 |
| Black colloidal silver | 0.24 |
| Gelatin | 2.0 |
| 2nd layer: Intermediate layer | |
| 2,5-di-t-octylhydroquinone | 0.1 |
| High-boiling solvent O-1 | 0.2 |
| Gelatin | 1.0 |
| 3rd layer: low-speed red-sensitive silver halide emulsion layer | |
| Silver iodobromide emulsion (AgI content: 4.0 mol %, average grain size: 0.25 μm) spectrally sensitized with red sensitizing dyes (S-1, S-2) | 0.5 |
| Coupler C-1 | 0.1 |
| High-boiling solvent O-2 | 0.6 |
| Gelatin | 1.3 |
| 4th layer: high-speed red-sensitive silver halide emulsion layer | |
| Silver iodobromide emulsion (AgI content: 2 mol %, average grain size: 0.6 μm) spectrally sensitized by red sensitizing dyes (S-1, S-2) | 0.8 |
| Coupler C-1 | 0.2 |
| High-boilding solvent O-2 | 1.2 |
| Gelatin | 1.8 |
| 5th layer: Intermediate layer | |
| 2,5-di-t-octylhydroquinone | 0.1 |
| High boiling solvent O-1 | 0.2 |
| Gelatin | 0.9 |
| 6th layer: low speed green-sensitive silver halide emulsion layer | |
| Silver iodobromide emulsion (AgI content: 4 mol %, average grain size: 0.25 μm) spectrally sensitized with red sensitizing dyes (S-3, S-4) | 0.6 |
| Coupler M-1 | 0.04 |
| Coupler M-2 | 0.01 |
| High-boiling solvent O-3 | 0.5 |
| Gelatin | 1.4 |
| 7th layer: high-speed green-sensitive silver halide emulsion layer | |
| Silver iodobromide emulsion (AgI content: 2 mol %, average grain size: 0.6 μm) spectrally sensitized by green sensitizing dyes (S-3, S-4) | 0.9 |
| Coupler M-1 | 0.10 |
| Coupler M-2 | 0.02 |
| High-boiling solvent O-3 | 1.0 |
| Gelatin | 1.5 |
| 8th layer: Intermediate layer | |
| Same as the 5th layer | |

-continued

| | |
|---|---|
| 9th layer: yellow filter layer | |
| Yellow colloidal silver | 0.1 |
| Gelatin | 0.9 |
| 2,5-di-t-octylhydroquinone | 0.1 |
| High-boiling solvent O-1 | 0.2 |
| 10th layer: low-speed blue-sensitive silver halide emulsion layer | |
| Silver iodobromide emulsion (AgI content: 4 mol %, average grain size: 0.35 μm) spectrally sensitized with a blue sensitizing dye (S-5) | 0.6 |
| Coupler Y-1 | 0.3 |
| High-boiling solvent O-3 | 0.6 |
| Gelatin | 1.3 |
| 11th layer: high-speed blue-sensitive silver halide emulsion layer | |
| Silver iodobromide emulsion (AgI content: 2 mol %, average grain size: 0.9 μm) spectrally sensitized with a blue sensitizing dye (S-5) | 0.9 |
| Coupler Y-1 | 0.5 |
| High-boiling solvent O-3 | 1.4 |
| Gelatin | 2.1 |
| 12th layer: 1st protective layer | |
| Ultraviolet absorbent U-1 | 0.3 |
| Ultraviolet absorbent U-2 | 0.4 |
| High-boiling solvent O-3 | 0.6 |
| Gelatin | 1.2 |
| 2,5-di-t-octylhydroquinone | 0.1 |
| 13th layer: 2nd protective layer | |
| Non-light-sensitive fine-grained silver halide emulsion consisting of silver iodobromide (average grain size: 0.08 μm) containing 1 mol % silver iodide silver amount Polymethyl methacrylate particles (grain size: 1.5 μm) Surfactant SA-1 | 0.3 |
| Gelatin | 0.7 |

Besides the preceding components, a gelatin hardener H-1 or a surfactant were added to each layer. Tricresyl phosphate was employed as the solvent for the coupler. The silver halide emulsions used in the 3rd, 4th, 6th, th and 10th layer were each a monodisperse emulsion having the grain distribution width of not more than 20% and the emulsion used in the 11th layer was a polydisperse emulsion having the grain distribution width of 32%.

Ultraviolet absorbents U-1

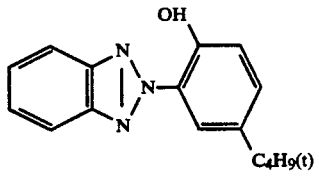

Ultraviolet absorbents U-2

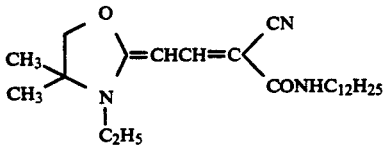

Sensitizing dyes S-1

-continued

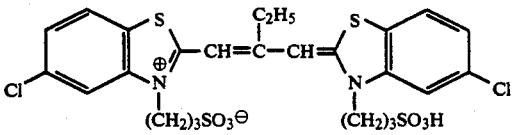

Sensitizing dyes S-2

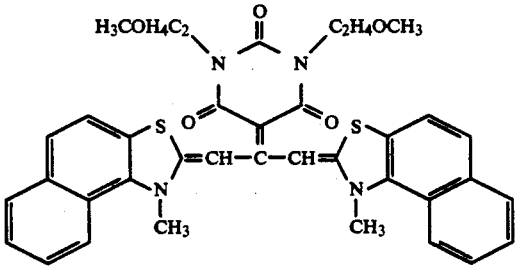

Sensitizing dyes S-3

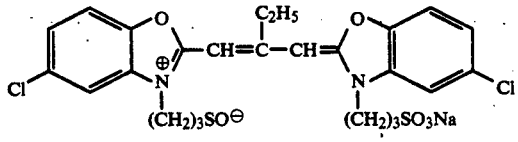

Sensitizing dyes S-4

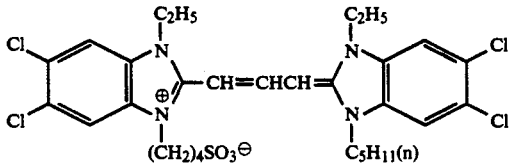

Sensitizing dyes S-5

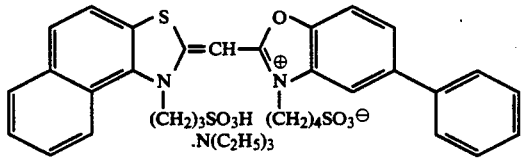

Couplers C-1

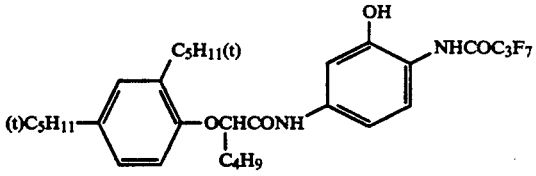

Coupler M-1

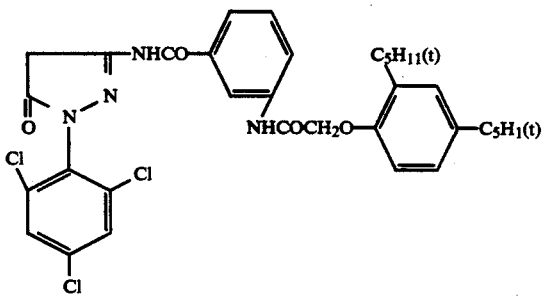

-continued

Couplers M-2

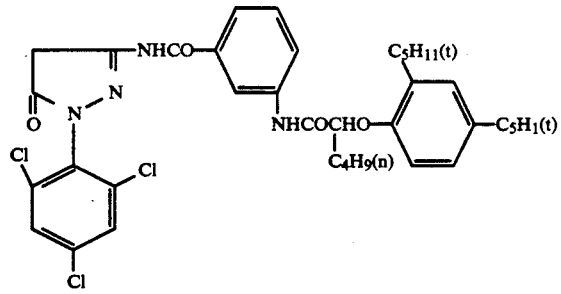

Couplers Y-1

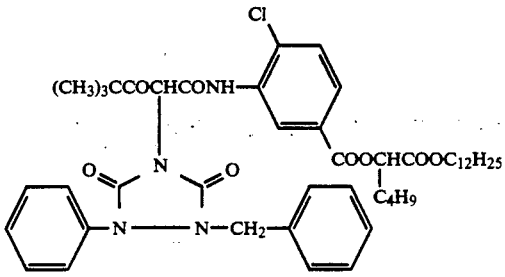

Gelatin hardener H-1

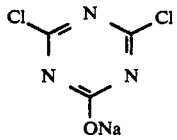

Surfactant SA-1

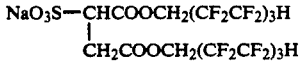

O-1

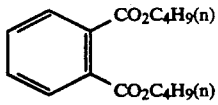

O-2

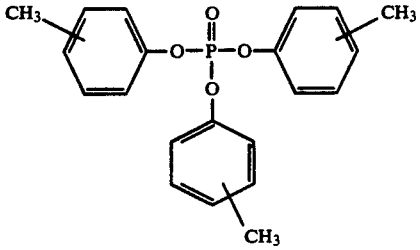

O-3

-continued

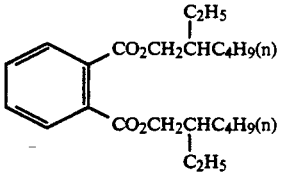

Meanwhile, Samples 2 was prepared in the same manner as in the preparation of Comparative Sample 1, except that 5% in terms of silver of silver halide contained in the 10th layer was replaced with that of the emulsion the same as used in the 11th layer. Samples 3 and 4 were prepared by replacing 10% and 30%, respectively, of silver halide contained in the 10th layer with that of the emulsion the same as used in the 11th layer. Further, Sample 5 was prepared the same as Comparative sample 1 except that the emulsion in the 11th layer was replaced with a monodisperse emulsion which was sensitized by blue-sensitized dye (S-5) and had the grain distribution width of 13% and the same AgI content and average grain size as the emulsion used in Sample 1, and 30% of silver halide contained in the 10th layer is replaced by that of the monodisperse emulsion the same as used for the 11th layer.

Each sample was exposed to white light through an optical wedge, followed by development under the following conditions. As to the 1st development, 4, 5, 7 and 8 minute-development were also performed in addition to the ordinary 6-minute development.

| Processing procedures | Time | Temperature |
|---|---|---|
| 1st development | 6 min | 38° C. |
| Rinsing | 2 min | 38° C. |
| Fogging | 2 min | 38° C. |
| Color development | 6 min | 38° C. |
| Conditioning | 2 min | 38° C. |
| Bleaching | 6 min | 38° C. |
| Fixing | 4 min | 38° C. |
| Rinsing | 4 min | 38° C. |
| Stabilizing | 1 min | Ordinary temp. |
| Drying | | |

The processing liquids had the following compositions:

| | |
|---|---|
| Developer for the 1st development | |
| Sodium tetrapolyphosphate | 2 g |
| Sodium sulfite | 20 g |
| Hydroquinone monosulfonate | 30 g |
| Sodium carbonate (monohydrate) | 30 g |
| 1-phenyl-4-methyl-4-hydroxymethyl-3-pyrazolidone | 2 g |
| Potassium bromide | 2.5 g |
| Potassium thiocyanate | 1.2 g |
| Potassium iodide (0.1% solution) | 2 ml |
| Water was added to make total quantity | 1000 ml |
| Fogging solution | |
| Hexasodium nitrilotrimethylene phosphonate | 3 g |
| Stannous chloride (dihydrate) | 1 g |
| p-Aminophenol | 0.1 g |
| Sodium hydroxide | 8 g |
| Glacial acetic acid | 15 ml |
| Water was added to make total quantity | 1000 ml |
| Color developer | |
| Sodium tetrapolyphosphate | 3 g |
| Sodium sulfite | 7 g |
| Sodium triphosphate (dihydrate) | 36 g |
| Potassium bromide | 1 g |
| Potassium iodide (0.1% solution) | 90 ml |
| Sodium hydroxide | 3 g |

-continued

| | |
|---|---|
| Citrazinic acid | 1.5 g |
| N-ethyl-N-β-methanesulfonamidoethyl-3-methyl-4-aminoaniline sulphate | 11 g |
| 2,2-ethylenedithiodiethanol | 1 g |
| Water was added to make total quantity | 1000 ml |
| Conditioning solution | |
| Sodium sulfite | 12 g |
| Sodium ethylenediaminetetraacetate (dihydrate) | 8 g |
| Thioglycerine | 0.4 ml |
| Glacial acetic acid | 3 ml |
| Water was added to make total quantity | 1000 ml |
| Bleaching solution | |
| Sodium ethylenediaminetetraacetate (dihydrate) | 2 g |
| Ferric (III) ammonium ethylenediaminetetraacetate (dihydrate) | 120 g |
| Ammonium bromide | 100 g |
| Water was added to make total quantity | 1000 ml |
| Fixer | |
| Ammonium thiosulfate | 80 g |
| Sodium sulfite | 5 g |
| Sodium bisulfite | 5 g |
| Water was added to make total quantity | 1000 ml |
| Stabilizer | |
| Formalin (37 wt %) | 5 g |
| Konidax (manufactured by Konica Corp.) | 5 g |
| Water was added to make total quantity | 1000 ml |

For each sample, image density was measured with blue light, and relative sensitivity and gamma value were obtained.

Meanwhile, relative sensitivity is defined as the reciprocal of an exposure required to obtain a blue density of 1.0, and shown by the value relative to the standard value (set at 100) obtained when 6-minute development was performed.

Gamma value is defined as the gradient of a straight line connecting a density of 0.5 and a density of 1.0 in the exposure range.

The results of the measurement of gamma value and relative sensitivity, as well as the variation range of gamma value are shown in Table 1.

EXAMPLE 2

On a paper support with the both sides thereof coated with polyethylene (center line average roughness SRa=2.0 μm), the following layers 1 to 11 were provided in sequence to obtain a reversal-type color photographic light-sensitive material 21. The coated amount of each component is indicated by g/m$^2$, except for that of a silver halide which is expressed in terms of silver.

| | |
|---|---|
| 1st layer (Anti-halation layer) | |
| Black colloidal silver | 0.10 |
| Gelatin | 1.5 |
| 2nd layer (the low-speed red sensitive layer) | |
| Cyan coupler (C-1) | 0.08 |
| Cyan coupler (C-2) | 0.16 |
| Anti-fading agent (A-1) | 0.12 |
| Anti-fading agent (A-2) | 0.06 |
| High-boiling solvent (O-1) | 0.18 |
| Silver iodobromide emulsion (AgI content: 6.0 mol %, average grain size: 0.4 μm) spectrally sensitized with red sensitizing dyes (S-1, S-6) | 0.14 |
| Gelatin | 0.81 |
| 3rd layer (the high-speed red-sensitive layer) | |
| Cyan coupler (C-1) | 0.043 |
| Cyan coupler (C-2) | 0.085 |
| Anti-fading agent (A-1) | 0.064 |
| Anti-fading agent (A-2) | 0.032 |
| High-boiling solvent (O-1) | 0.097 |
| Silver iodobromide emulsion (AgI content: 6.0 mol %, average grain size: 0.8 μm) spectrally sensitized with a red sensitizing dye (S-3, S-6) | 0.16 |
| Gelatin | 0.98 |
| 4th layer (the 1st intermediate layer) | |
| Anti-color contamination agent (AN-1) | 0.02 |
| Anti-color contamination agent (AN-2) | 0.06 |
| High-boiling solvent (O-2) | 0.13 |
| Gelatin | 0.9 |
| 5th layer (low-speed green-sensitive layer) | |
| Magenta coupler (M-3) | 0.25 |
| Anti-fading agent (A-3) | 0.067 |
| Anti-fading agent (A-4) | 0.12 |
| High-boiling solvent (O-1) | 0.19 |
| Silver iodobromide emulsion (AgI content: 2.5 mol %, average grain size: 0.4 μm) spectrally sensitized with a greed sensitizing dye (S-3) | 0.15 |
| Gelatin | 0.93 |
| 6th layer (high-speed green-sensitive layer) | |
| Magenta coupler (M-3) | 0.15 |
| Anti-fading agent (A-3) | 0.04 |
| Anti-fading agent (A-4) | 0.07 |
| High-boiling solvent (O-4) | 0.11 |
| Silver iodobromide emulsion (AgI content: 3.5 mol %, average grain size: 0.7 μm) spectrally sensitized with a green sensitizing dye (S-3) | 0.15 |
| Gelatin | 0.83 |
| 7th layer (the 2nd intermediate layer) | |
| Yellow colloidal silver | 0.02 |
| Anti-stain agent (AN-1) | 0.014 |

TABLE 1

| | 4 minutes*1 | | 5 minutes*1 | | 6 minutes*1 | | 7 minutes*1 | | 8 minutes*1 | | Gamma value variation range | | | |
|---|---|---|---|---|---|---|---|---|---|---|---|---|---|---|
| Sample No. | γ4' | Sensitivity | γ5' | Sensitivity | γ6' | Sensitivity | γ7' | Sensitivity | γ8' | Sensitivity | \|γ4'−γ6'\| | \|γ5'−γ6'\| | \|γ7'−γ6'\| | \|γ8'−γ6'\| |
| Comparative 1 | 1.34 | 36 | 1.37 | 64 | 1.40 | 100 | 1.42 | 129 | 1.43 | 151 | 0.06 | 0.03 | 0.02 | 0.03 |
| Inventive 2 | 1.38 | 38 | 1.41 | 66 | 1.42 | 100 | 1.43 | 126 | 1.44 | 145 | 0.04 | 0.01 | 0.01 | 0.02 |
| Inventive 3 | 1.41 | 39 | 1.42 | 66 | 1.43 | 100 | 1.44 | 123 | 1.45 | 145 | 0.02 | 0.01 | 0.01 | 0.02 |
| Inventive 4 | 1.43 | 41 | 1.44 | 71 | 1.44 | 100 | 1.44 | 117 | 1.45 | 138 | 0.01 | 0 | 0 | 0.01 |
| Inventive 5 | 1.44 | 43 | 1.45 | 74 | 1.45 | 100 | 1.45 | 115 | 1.45 | 135 | 0.01 | 0 | 0 | 0 |

*1:The "minutes" in the upper column indicate the time of development.

*2:Gamma value variation is defined as the absolute value of a difference in gamma value between the standard 6-minute development and other development (4-, 5-, 7-, 8-minute development)

As is evident from the results shown in Table 1, as compared with comparative samples, a smaller gamma value variation was observed in each inventive sample, which proves that the inventive samples had improved stability against the variation of processing conditions. Further, in the case of the inventive samples, sensitivity changed uniformly with the change of the 1st development time, which proves that the inventive samples were excellent in adaptability to shortened and forced development.

Excellent results were also obtained as to the inventive samples when a similar experiment was conducted for the red- and green-sensitive emulsion layers, which proves that the effects of the invention could be obtained irrespective of color sensitivity.

-continued

| | |
|---|---|
| Anti-stain agent (AN-2) | 0.046 |
| High-boiling solvent (O-1) | 0.096 |
| Gelatin | 0.90 |
| 8th layer (low-speed blue-sensitive layer) | |
| Yellow coupler (Y-2) | 0.24 |
| Anti-fading agent (A-1) | 0.096 |
| Anti-fading agent (A-5) | 0.048 |
| High-boiling solvent (O-6) | 0.048 |
| Silver iodobromide emulsion (AgI content: 2.5 mol %, average grain size: 0.4 μm) spectraly sensitized with a blue sensitizing dye (S-5) | 0.15 |
| Gelatin | 0.95 |
| 9th layer (high-speed blue-sensitive layer) | |
| Yellow coupler (Y-2) | 0.32 |
| Anti-fading agent (A-1) | 0.13 |
| Anti-fading agent (A-5) | 0.064 |
| High-boiling solvent (O-3) | 0.064 |
| Silver iodobromide emulsion (AgI content: 2.5 mol %, average grain size: 0.8 μm) spectrally sensitized with a blue sensitizing dye (S-5) | 0.13 |
| Gelatin | 0.93 |
| 10th layer (ultraviolet absorbing layer) | |
| Ultraviolet absorbent (U-3) | 0.45 |
| Ultraviolet absorbent (U-4) | 0.15 |
| Anti-color contamination agent (AN-1) | 0.33 |
| High-boiling solvent (O-3) | 0.037 |
| Gelatin | 1.87 |
| 11th layer (protective layer) | |
| Gelatin | 0.50 |

The light-sensitive material also contained a surfactant, a hardener and an anti-irradiation dye.

The emulsion used in the 2nd and 3rd layers were polydisperse emulsions having the grain size distribution width of 25% and 23%, respectively, and the emulsions used in the 5th, 6th, 8th and 9th layers was each a monodisperse emulsion having a distribution width of not more than 20%.

Sensitizing dye S-6

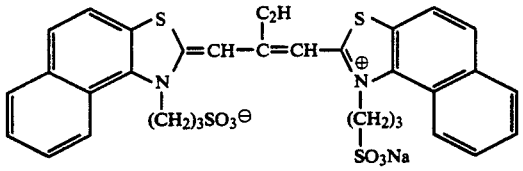

C-2

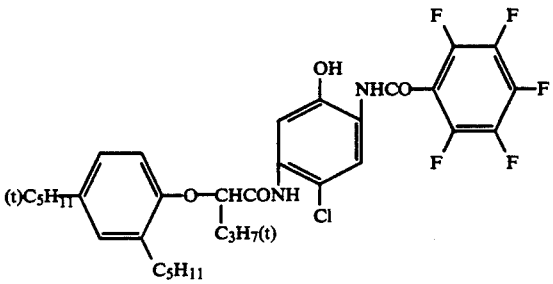

C-3

-continued

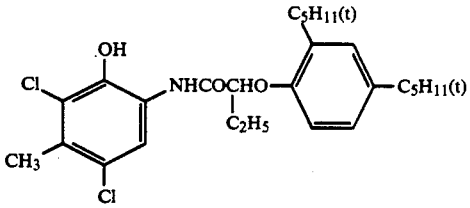

M-3

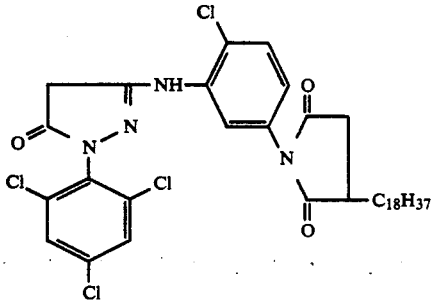

Y-2

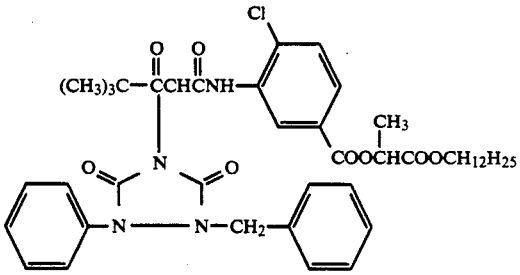

A-1

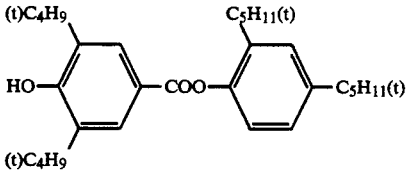

A-2

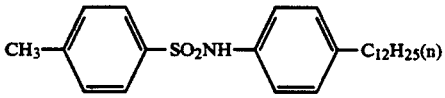

A-3

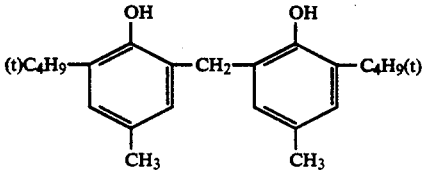

A-4

-continued

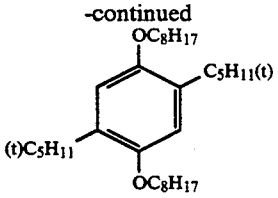

A-5

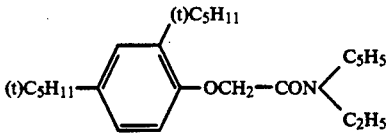

AN-1

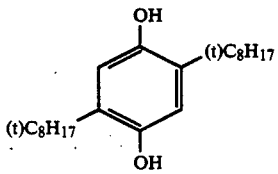

AN-2

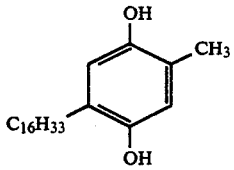

O-4 di-2-ethylhexylphthalate

O-5 di-isodecylphthalate

O-6 di-nonylphthalate

U-3

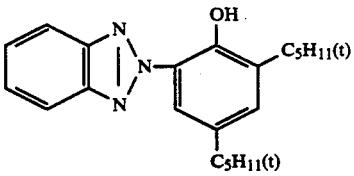

U-4

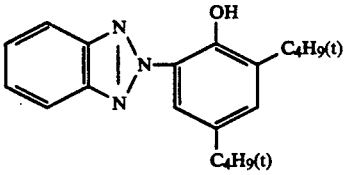

Silver halide emulsions employed for the light-sensitive layers were prepared by the method described in Example 1 of Japanese Patent O.P.I. Publication No. 178447/1984. After desalting and rinsing, each emulsion was subjected to optimum chemical sensitization in the presence of sodium thiosulfate, chlorauric acid and ammonium thiocyanate, followed by chemical ripening by adding a sensitizing dye and 4-hydroxy-6-methyl-1,3,3a,7-tetrazaindene and 1-phenyl-5-mercaptotetrazole.

Meanwhile, Sample 22 was prepared in the same manner as in the preparation of Sample 21, except that 5% in terms of silver of silver iodobromide contained in the 2nd layer was replaced with that of the emulsion the same as used in the 3rd layer. Samples 23 and 24 were prepared by replacing 10% and 30%, respectively, of silver halide contained in the 2nd layer with that of the emulsion the same as used in the 3rd layer. Further, Sample 25 was prepared in the same manner as in Sample 21 except that the emulsion of the 2nd and 3rd layers were replaced with monodisperse emulsion, each of which had the grain size distribution width of 13% and the same AgI content and average grain size as those of the emulsions used in Sample 21 and was sensitized with red-sensitizers S-1 and S-2, and 30% of silver halide contained in the 2nd layer was replaced with that of the monodisperse emulsion the same as used in the 3rd layer.

Each sample was exposed to white light through an optical wedge, followed by development under the following conditions. As to the 1st development, 1- and 1.5 minute-development was performed in addition to the standard 1.25 minute-development.

| | | |
|---|---|---|
| 1st development (monochromatic) | 1 min | 15 sec at 38° C. |
| Rinsing | 1 min | 30 sec |
| Fogging with light not less than 100 lux | not less than 1 sec | |
| 2nd development (color) | 2 min | 15 sec at 38° C. |
| Rinsing | | 45 sec |
| Bleach-fixing | 2 min | at 38° C. |
| Rinsing | 2 min | 15 sec |

| Developer for the 1st development | |
|---|---|
| Potassium sulfite | 3.0 g |
| Sodium thiocyanate | 1.0 g |
| Sodium bromide | 2.4 g |
| Potassium iodide | 8.0 mg |
| Potassium hydroxide (48%) | 6.2 ml |
| Potassium carbonate | 14 g |
| Sodium hydrogen carbonate | 12 g |
| 1-phenyl-4-methyl-4-hydroxymethyl-3-pyrazolidone | 1.5 g |
| Hydroquinone monosulfate | 23.3 g |
| Water was added to make total quantity | 1.0 l (pH = 9.65) |
| **Color developer** | |
| Benzyl alcohol | 14.6 ml |
| Ethylene glycol | 12.6 ml |
| Potassium carbonate (anhydride) | 26 g |
| Potassium hydroxide | 1.4 g |
| Sodium sulfite | 1.6 g |
| 3,6-dithiaoctane-1,8-diol | 0.24 g |
| Hydroxylamine sulfate | 2.6 g |
| N-ethyl-N-β-methanesulfonamidoethyl-3-methyl-4-aminoaniline sulfate | 5.0 g |
| Water was added to make total quantity | 1.0 l |
| **Bleach-fixer** | |
| Ferric ammonium ethylenediaminetetraacetate (1.56 mol solution) | 115 ml |
| Sodium metabisulfite | 15.4 g |
| Ammonium thiosulfate (58%) | 126 ml |
| 1,2,4-triazole-3-thiol | 0.4 g |
| Water was added to make total quantity | 1.0 l (pH = 6.5) |

Each of the samples was subjected to den red light and gamma value was determined. Gamma value is defined as the gradient of a straight line connecting a density of 0.5 and a density of 1.0 in the exposure range.

The results of this measurement and the variation range of gamma value with the change of development time are shown in Table 2.

TABLE 2

| | Gamma value Developing time | | | Gamma value variation range | |
|---|---|---|---|---|---|
| Sample No. | 1 min (A) | 1 min 15 sec (B) | 1 min 30 sec (C) | B-A | C-B |
| 21 (Comparative) | 1.37 | 1.42 | 1.48 | 0.05 | 0.06 |
| 22 Inventive | 1.40 | 1.44 | 1.48 | 0.04 | 0.04 |
| 23 Inventive | 1.42 | 1.45 | 1.47 | 0.03 | 0.02 |
| 24 Inventive | 1.45 | 1.47 | 1.47 | 0.02 | 0 |
| 25 Inventive | 1.47 | 1.48 | 1.48 | 0.01 | 0 |

As is evident from the results shown in Table 2, as compared with comparative samples, a smaller gamma value variation was observed in the inventive samples, which proves that the inventive samples had improved stability against the variation of processing conditions.

Excellent results were also obtained as to the inventive samples when a similar experiment was conducted for the blue- and green-sensitive layers, which proves that the effect of the invention can be obtained irrespective of color sensitivity.

What is claimed is:

1. A process for manufacturing a silver halide color photographic light-sensitive material having a blue light-sensitive layer-unit, a green light-sensitive layer-unit and a red light-sensitive layer-unit in which at least one of said light-sensitive layer-units comprises two or three silver halide emulsion layers being substantially the same in spectral sensitivity and different in speed from each other, comprising steps of producing a high-speed silver halide emulsion having a largest average grain size among the silver halide emulsions to be used in said at least one light sensitive layer-unit, chemically sensitizing said high-speed silver halide emulsion, producing a low-speed silver halide emulsion having a smaller average grain size than that of said high-speed emulsion, chemically sensitizing said low-speed emulsion, mixing said chemically sensitized high-speed and said chemically sensitized low-speed emulsion in a ratio of from 5:95 to 50:50 by weight in terms of silver, and coating said chemically sensitized high-speed emulsion and said mixture of said chemically sensitized high-speed emulsion and said chemically sensitized low-speed emulsion to form said at least on light-sensitive layer-unit.

* * * * *